(12) United States Patent
de Jong

(10) Patent No.: US 9,076,023 B2
(45) Date of Patent: Jul. 7, 2015

(54) METHOD FOR REMOTELY DETERMINING CLOTHES DIMENSIONS

(75) Inventor: Fokke Marten de Jong, Amsterdam (NL)

(73) Assignee: SUIT SUPPLY B.V., Amsterdam (NL)

( * ) Notice: Subject to any disclaimer, the term of this patent is extended or adjusted under 35 U.S.C. 154(b) by 86 days.

(21) Appl. No.: 13/697,059

(22) PCT Filed: Apr. 21, 2011

(86) PCT No.: PCT/NL2011/000032
§ 371 (c)(1),
(2), (4) Date: Dec. 18, 2012

(87) PCT Pub. No.: WO2011/142655
PCT Pub. Date: Nov. 17, 2011

(65) Prior Publication Data
US 2013/0108121 A1     May 2, 2013

(30) Foreign Application Priority Data
May 10, 2010 (NL) .................................... 1037949

(51) Int. Cl.
*G06K 9/00* (2006.01)
*G06Q 30/06* (2012.01)
*A41H 3/00* (2006.01)
*A41H 3/02* (2006.01)

(52) U.S. Cl.
CPC . *G06K 9/00* (2013.01); *A41H 3/007* (2013.01); *A41H 3/02* (2013.01); *G06Q 30/06* (2013.01)

(58) Field of Classification Search
CPC ........................................................ G06K 9/00
USPC .......................................................... 382/111
See application file for complete search history.

(56) References Cited

U.S. PATENT DOCUMENTS

| 5,515,168 A | 5/1996 | Dudkiewicz |
| 6,182,871 B1 | 2/2001 | Lam |

(Continued)

FOREIGN PATENT DOCUMENTS

| CN | 101611939 A | 12/2009 |
| FR | 2921745 A1 | 4/2009 |

(Continued)

OTHER PUBLICATIONS

International Search Report and Written Opinion dated May 7, 2012, issued for corresponding PCT Application No. PCT/NL2011/000032.
International Preliminary Report on Patentability dated Nov. 13, 2012, issued for corresponding PCT Application No. PCT/NL2011/000032.

(Continued)

*Primary Examiner* — Stephen R Koziol
*Assistant Examiner* — Delomia Gilliard
(74) *Attorney, Agent, or Firm* — Banner & Witcoff, Ltd.

(57) ABSTRACT

Method for remotely ordering clothing for a person (1), the person sends two profile images of himself/herself to the processing means (11), which determines there from two person profiles. The processing means determines the requested clothes size or clothes dimensions, by using a data set (12) with representations of virtual persons or pieces of clothing. The processing means use a matching, fitting or rendering algorithm for determining the largest similarity between the supplied person profiles and the representations of virtual people or clothes in said generic data set. Input into the processing means is done via a local terminal, via the Internet.

19 Claims, 5 Drawing Sheets

(56) References Cited

U.S. PATENT DOCUMENTS

| | | | |
|---|---|---|---|
| 6,546,309 B1* | 4/2003 | Gazzuolo | 700/132 |
| 6,629,014 B1 | 9/2003 | Lam | |
| 7,328,119 B1 | 2/2008 | Pryor | |
| 8,073,560 B1* | 12/2011 | Clardy et al. | 700/132 |
| 2002/0004763 A1* | 1/2002 | Lam | 705/26 |
| 2007/0032898 A1* | 2/2007 | Wang | 700/132 |
| 2007/0198120 A1* | 8/2007 | Wannier et al. | 700/138 |
| 2008/0235114 A1 | 9/2008 | Wannier | |
| 2009/0204335 A1* | 8/2009 | Wang | 702/19 |
| 2010/0030578 A1 | 2/2010 | Siddique | |
| 2011/0055054 A1* | 3/2011 | Glasson | 705/27.2 |

FOREIGN PATENT DOCUMENTS

| | | |
|---|---|---|
| GB | 2432029 A | 5/2007 |
| JP | 2002-149828 A | 5/2002 |
| JP | 2003-049307 A | 2/2003 |
| JP | 2009-128996 A | 6/2009 |
| WO | 0153910 A2 | 7/2001 |
| WO | 2005114506 A1 | 12/2005 |

OTHER PUBLICATIONS

Mar. 31, 2015 (CN)—Office Action Application 201180023379.2.

* cited by examiner

METHOD FOR REMOTELY DETERMINING CLOTHES DIMENSIONS

RELATED APPLICATION DATA

This application is a National Stage Application under 35 U.S.C. 371 of co-pending PCT application PCT/NL2011/000032, designating the United States and filed Apr. 21, 2011, titled "Method for Remotely Determining Clothes Dimensions", which claims the priority benefit of NL Patent Application No. 1037949, filed May 10, 2010, titled "Method for Remotely Determining Clothes Dimensions", the entire disclosure of each of which is hereby incorporated by reference for all purposes.

The invention relates to a method for determining one or more clothes dimensions, in particular for remotely tailoring clothing.

Clothes size can be defined as the size of a ready-to-wear garment, for example, size 48 or 52. However, in the context of this application, by clothes size can also be meant one of the (many) body dimensions, which are measured e.g. by a tailor, to be able to determine the correct clothes size (e.g. size 48 or 49) of the customer. Furthermore, in the context of this application, by clothes size can be meant the multitude of (body) dimensions which a tailor needs to manufacture a tailored suit for a customer. Below the terms clothes dimensions and body dimensions will be used, which are considered to correspond with each other to a large extend. Furthermore, also the term (the) clothes size is used, more as an indication of a (standard) ready-to-wear clothes size (e.g. size 48 or 52), and also as order size or order dimensions, as an indication of the size or dimensions respectively of the piece of clothing ordered.

Increasingly, suppliers of clothing offer the opportunity for remotely ordering clothes, particularly via the Internet. It is clear that the clothing, e.g. a suit, cannot be tailored in that case by a qualified seller or tailor. An in general non-professional person should measure then the personal, individual body dimensions which are relevant for the clothing. It is attempted then to determine the correct (order) dimensions by measuring directly over the skin or over fitting underwear. Relevant dimensions include the body length, neck girth, chest girth, waist girth, lower hip girth, upper hip girth and inside leg length.

In practice, it appears that the public is still rather reserved towards self-measuring of expensive clothes like costumes etc., which attitude withholds the online sales of such clothes.

One aspect of the present invention is to provide an improved and more publicly acceptable method for remotely tailoring clothes.

Another aspect of the invention is to make use of equipment generally in use by the public such as (digital) cameras, etc., as well as Internet web browsers, web applications etc. generally in use by the public.

At this point it should be noted that the use of one or more cameras for determining clothes dimensions is known as such, among others from US20020004763, which will be further discussed below. It is not known, however, that (1) this is performed by the (generally non-expert) public, (2) in (for example) a domestic environment, i.e. not in an environment which is (professionally) equipped for measuring clothes dimensions, and (3) remotely, for example via the Internet.

Yet another aspect of the invention is the local, by the customer himself/herself or his/her immediate environment (e.g. partner), production of one or more images of himself/herself and to have it converted into relevant clothes dimensions by a remote server and processing means in conjunction with software on the local terminal of the customer. The data between the local terminals are transferred via the Internet or another network.

The method for remotely determining the clothes dimensions or (ready-to-wear) clothes size of a person preferably comprises the following steps:

the person provides at least one (preferably two) profile images of himself/herself, and—preferably—of a reference object (for example a credit card or a sheet of A4 paper), for scaling and/or correction of the profile images or person profiles derived therefrom;

the person sends those images to processing means, for example via his/her PC, mobile phone/camera, iPod, etc.;

the processing means determine from the received images (preferably two) person profiles of the person, preferably using the reference objects also present on the images;

the processing means determine, at least partially by using a data set with representations of virtual people or clothes, the requested clothes dimensions or clothes size of the person.

Already here it is noted that within the concept of "virtual persons or clothes" in particular can be thought of (data on) volume, posture, shape etc. which are occupied by (virtual) people, and/or (data on) volume, posture, shape etc. which can be fittingly covered by (virtual) clothes, like the volume, posture, shape, etc. of a (virtual) tailor's dummy (or mannequin). In particular at volume there is thought of length, girth, BMI, etc., at posture of body postures like upright, bent, etc., and at shape of concepts such as endomorphic, mesomorphic, ectomorphic or V-, H-, HX-, A-, X- and O-type.

The processing means may derive some measures, such as length and width dimensions, rather directly from the person profiles and the reference object. Other dimensions, such as neck girth, chest girth, waist girth, hip girth, abdominal girth, however, should be derived from the data set, where the profiles received are compared to the representations of virtual people or pieces of clothing available in the data set, which dimensions cannot directly be derived from the person profiles received.

Thus, from the images (pictures) transmitted by the customer (two) personal profiles are created (and scaled), from which some dimensions can be derived fairly readily, while other dimensions—or even the best fitting ready-to-wear clothes size (e.g. size 52)—are derived by "matching" with the representations in the data set, so that the best fitting (additional) clothes dimensions for the transmitted profiles can be determined.

Hereafter it is firstly assumed that the data set is a representation of a large number of virtual persons, where from the transmitted 2D information (from the person profiles) additional (3D) information can be obtained, in particular circumferential information (since it cannot be directly derived from the transmitted images). After the discussion thereof, the text will focus on two other data sets, namely data sets which are not filled with data that represent virtual persons but with data that represent virtual clothes, either a (relatively small) set of virtual ready-to-wear suits in the available (that is already produced) sizes, or a (large) set of virtual tailored suits (yet to be manufactured under control of a complete set of detailed manufacturing or pattern measures).

The invention is originally based on the insight that from a few, for example two 2D images (especially photos) of the person, one of the front or rear side and one from the lateral side, in particular length and width-/depth dimensions (by depth dimensions is meant the measurements between the front and back side), after calibration using the reference object, can be determined (rather) directly, while 2D images can be further used to determine characteristics in a (third) dimension, to be determined by general "knowledge" about (the 3D shape of) the human body or appropriate clothing therefore, which knowledge is available in the form of a data set, namely by the correlating 1D or 2D information from the 2D images to (3D) data set. Thus for tailoring a garment, the necessary dimensions, which cannot be directly derived from the 2D images, can be constructed using a 3D data set.

In short, the following routes are available for solving this problem, in other words for constructing or trace back the missing dimensions from the available 2D images:

I Determine from the 2D images some relevant 1D values (e.g. width and depth of the body of the person at the height of his waist), supply them to a formula that describes the relationship between the 1D values and a value which cannot not directly be determine from the 2D images, such as the waist girth. Similarly, from the two 2D images, the width and depth of the chest, abdomen etc. are "read" and, by entering them into a suitable "breast respectively waist girth formula", the girth of the breast and/or the abdomen is determined, which girth dimensions are of great importance for the proper fit of the clothing.

II a. Compare the 2D images with a generic (3D) data set containing representations of virtual people or clothes and select the most appropriately fitting 3D representation for the 2D images. Then derive the missing features (such as the girth features) from that "best match" representation. The directly (from the transmitted images) and indirectly (through matching with the set of representations) determined dimensions are "scaled" at some point in the process using at least one calibration dimension or factor derived from the reference object, according to the dimensions of the actual person.

b. Construct by using the 2D images and a generic (3D) data set with representations of virtual of persons or clothes a virtual person that best fits with the 2D images. Then derive the missing features (such as the girth features) from that "best fitting" virtual person. Again somewhere in the process scaling takes place.

According to the first solution route I the processing means may determine, from at least one front or rear view of the person on one or more measuring height levels x=1 . . . n, a width dimension (or measure) $a_x$, and determine from at least one side view a depth dimension (or measure) $b_x$ and determine by using the formula $O_x=f_x*(a_x+b_x)$ the body circumference $O_x$ on one or more measuring height levels x, where $f_x$ is the circumference factor for the measuring height level concerned, derived from a generic data set with representations of virtual person or clothes. Applicant has found that the circumference factor $f_x$ for clothes dimensions, in particular at relevant measuring height levels, such as breast, waist and hips height level, etc., has values between 1.56 and 1.72, preferably between the values 1.62 and 1.66 and more preferably has a value substantially equal to 1.64.

If desired, the said measuring height levels may be determined by the processing means using the received front or rear view and side view of the person and by using a generic data set with representations of virtual persons.

Preferably, to improve the result, the value determined for the body circumference $O_x$ is adjusted using one or more correction factors $c_x$. For example, the person may input additional information in the processing means, relating to his or her posture, in particular relating to the body circumference(s) on the aforementioned measuring height levels, which additional information is converted by the processing means to one or more correction factors $c_x$.

Alternatively, instead of the person (the customer), an operator, for example an expert seller or tailor, so someone with knowledge regarding relevant characteristics of the human body and regarding dressing of persons (size, posture features), on the basis of the received images and/or directly determinable clothes dimensions of the person (length, width), additional information may be input into the processing means relating to the posture of the person, in particular relating to the body circumferences ($O_x$) on the said measuring height levels (x), which additional information is converted by the processing means into one or more correction factors $c_x$.

The correction factors $c_x$ may also be influenced or determined by the processing by means of the received images and/or from directly determinable clothing dimensions of the person, using a generic data set with representations of virtual people. In this option use is (also) made of "knowledge from experience" which in this case does not come from an (expert) person such as a vendor or tailor, but is contained in a generic data set with representations of virtual people.

According to the above indicated solution route IIb, the processing means, based on the received images and on a generic data set with representations of virtual persons, may construct a virtual person (e.g. in 3D: 2D/3D fitting/rendering) for which, for example using a fitting/rendering algorithm, the physical features correspond optimally with those of the (real) person on the received images. Subsequently are presented the not directly from the received images of the person determinable, clothes dimensions, measures or sizes, belonging to the virtual person and derived from the data set.

Regarding the place and/or implementation of the processing means is noted that input of the customer-made images into the processing means preferably takes place via a local terminal or PC. In principle, however, the customer can also supply non-digital photographs, sent by post to send a service where the processing means are. There the images are then digitized and processed in that form processed as indicated in the previous text.

It is also possible that the processing means is installed at least partly local, for example in the PC of the customer or in other (intelligent) terminal. The processing means, or at least a portion, may also be centrally installed. Communication between the local terminal or PC and the central part of the processing means then preferably takes place via a data network such as the Internet. Also, the processing means, or at least a portion, may be distributed installed (distributed intelligence).

The present method thus makes it possible that a client (customer), in his/her house with his/her own camera, just takes a few (2D) pictures of himself/herself (preferably including a reference object) and send it to a "web store". There, from those photos directly measurable body dimensions ($a_x$, $b_x$) and—by (for example) "matching" with a generic data set and/or a generic body model—not (directly) from the photos derivable body dimensions, particularly the relevant circumference measurements ($O_x$) are calculated. Based on the measurements $a_x$, $b_x$ and $O_x$ (where x represents different measuring height levels), the clothes size of the customer can be determined.

Returning to the aforementioned prior art US20020004763 (based on U.S. Pat. Nos. 6,629,014, 6,182,871, WO0153910 and U.S. Provisionals 60/177,404 and 60/180,108), a method is proposed there wherein the customer—not at home, but in the shop of the supplier, in other words in a professional environment and using professional equipment—a large number of pictures or (even) a video is made from many angles and preferably using "measurement outfit" or "reference clothing" (see for example section 0022, 0023, FIGS. 3 and 4). Due to the large number of images taken from different positions and from a known distance from the customer (by a moving camera or by a number of differently arranged cameras), apart from the by "trained personnel" (paragraph 0031) operated professional equipment and the "measurement outfit" or "reference clothing" etc., a large number of 2D (profile) images is obtained from the customer with which, without special measures—since taken from many different angles (FIG. 4) and under well-defined conditions—not only the length and width dimensions, but also the circumference measurements ($O_x$) of the client can be determined. All these dimensions of the customer are subsequently—the subject of a significant part of US20020004763—coded to a "body profile (BP) code in a "manageable" data format of (only) 4 or 5 bits (section 0073).

Unlike the present patent application, US20020004763 is not dealing with the problem of deriving (circumference) dimensions from only a few (for example two) photo images, which—without special measures—cannot be determined from (some) photo images. Applying a (large) generic set of data of a generic body model as means to determine, from just a few amateur images, taken in a non-professional, non-conditioned and/or undefined environment, the requested circumference measurements $O_x$ or other body or clothes dimensions, is thus not known from US20020004763.

As indicated above, now two alternatives for the data set will be discussed, namely wherein it is not filled with data representing virtual persons, but with data representing virtual clothes, either a (limited) set of virtual ready-to-wear suits, or a (relatively large) set of virtual tailored suits.

When the data set represents a collection of ready-to wear garments which are offered by the provider of these garments and from which the client can make his choice, then that data set must include all relevant measurements of these ready-to wear garments necessary for the "tailoring" by—"matching", "fitting" etc.—of the garment to the customer of whom the (two) 2D profiles were created by the processing means based on the pictures received. Two methods can be chosen: either the (two) person profiles are compared to ("fitted in") 3D representations of various clothes in the data set, or all 3D representations of ready-to wear garments are not themselves included in the data set, but each (initially) converted into (two pairs) 2D virtual person profiles, which as it were, would fit in that (virtual) garment. There are thus, during carrying out the method, two options: either personal profiles (2D) obtained from the customer are compared with the 3D representation of each virtual piece of clothing in the data set, or either,—after initially converting all these 3D representations into 2D representations of virtual person profiles—the from the customer originated (2D) person profiles are compared to the 2D representations of virtual person profiles and with a "match" thereof the associated clothes size, corresponding to the 2D representations, is taken as the sought (ready-to-wear) clothes size, in other words as the best fitting to (the profiles of) the customer ready-to-wear clothes size.

When the data set represents a collection of tailored clothes, the same actions may be performed: comparing the person profiles of the customer with all dimensions of the 3D or 2D representations of the (very large) collection of tailored suits and then selecting the manufacturing or pattern measures (i.e. contained in) the most nearby garment representation for the actual manufacture of the garment.

The invention includes in addition to the above-proposed method with its various options, also a system, in particular processing means suitable for carrying out the proposed method.

Hereinafter the invention is further discussed by means of an illustrated embodiment.

Figure 1:
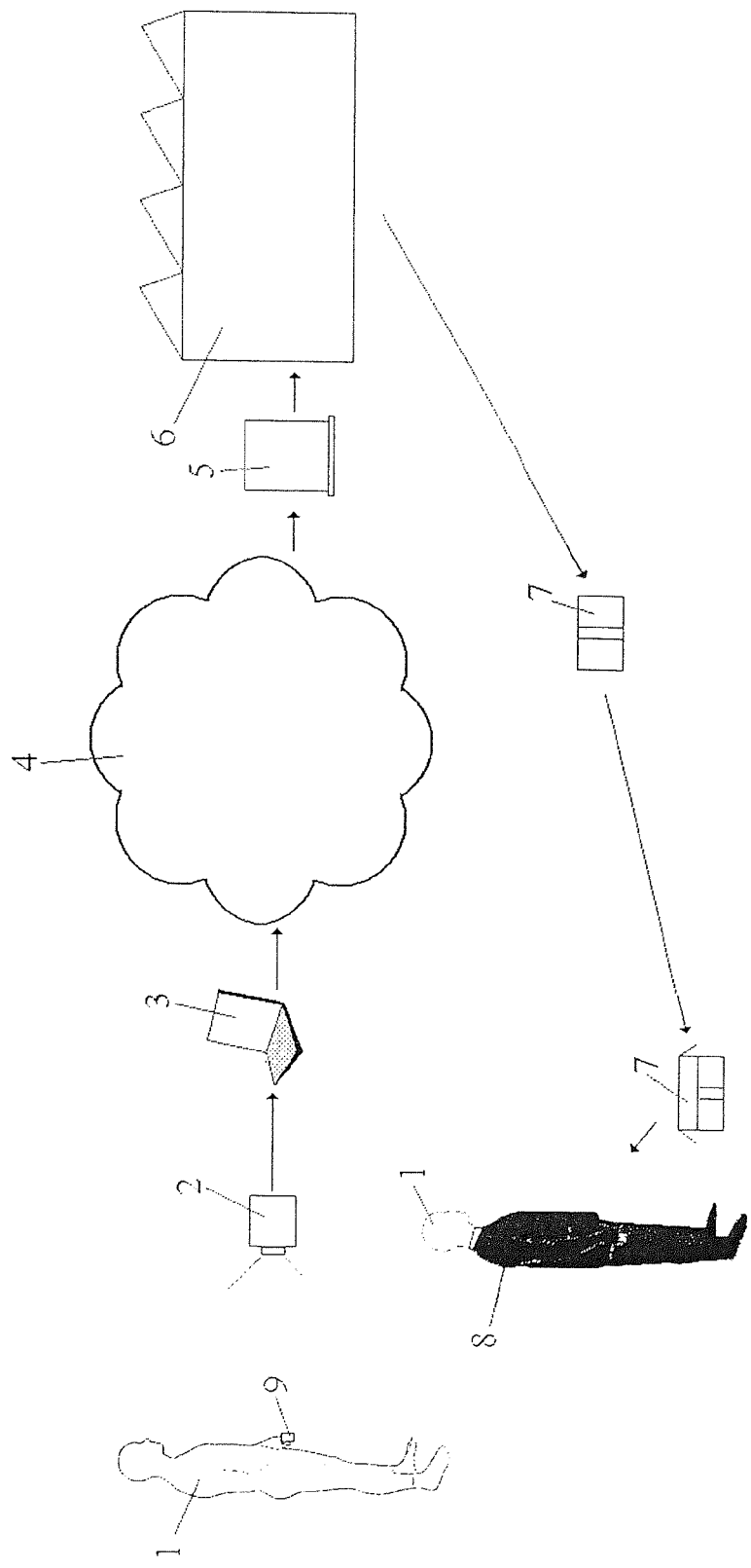
FIG. 1 shows a simple representation of a system for carrying out the method of the invention.

FIG. 1 shows a person 1 who wishes to order, via the Internet, a piece of clothing or garment, such as a suit. He (or she) makes use of a digital camera 2, by which he takes—or lets take—two photographs of himself/herself, wearing only underwear. These photographs serve as a basis for determining the correct dimensions. These photos can, either directly (if the camera example is part of a mobile phone that has Internet access) or either through a terminal in the form of a laptop 3 with access to the Internet, be sent to a server 5 via the Internet 4. Besides the photos (for the dimensions) the person transmits via the Internet 4 of course also the colour, fabric quality, style etc. of the suit. The server 5 is arranged to correctly process all order data entered by the person. The photos received by server 5 are processed to data, i.e. clothes dimensions, by processing means appropriately arranged therefore—which possibly may be distributed over the server 5 and the laptop 3 (for example, within the laptop 3 any desired pre-processing may take place)—, which are sent to a location 6 (a warehouse, factory) with the intention of using them to select a suit with the right dimensions or ready-to wear clothes size from a collection already made suits (and also by the features entered by the person such as colour, fabric, etc.) or manufacture a custom tailored suit or costume (size force) for person 1. After that selection or manufacture the clothing is positioned in a container 7 and sent to a person. Upon arrival, the suit 8 is unpacked and put on.

It is further observed that the person 1 ensures that while making the photos a "reference object" 9, such as a credit card or another object of standardized dimensions that is visible on the photo. Because the dimensions thereof are known on the side of the processing means, on this basis a calibration or scaling factor can be calculated, by means of which the absolute dimensions of that person 1 can be calculated with sufficient accuracy. The location of that "scales" in the overall process itself is of secondary importance.

For calibration (scaling, normalizing) of images of the person supplied to the processing means, which person may also himself/herself enter calibration data, for example in the form of alphanumeric data, such as the length of the person, which can be measured by the person in its own (domestic) location. This information can then, together with further information as the selected type of suit, colour, etc. bank details and delivery address, be transmitted to the order server and used there to scale the images received. Additionally or alternatively, as already indicated, the calibration may be formed by a reference object of known size and/or shape, such as a credit card or a sheet of paper or a carton of standard dimensions. The actual (2D) dimensions of the person in the pictures sent can then be derived by the processing means from the dimensions of the reference object on the photos and from the actual (known to the processing means) dimensions of the corresponding reference object.

Additionally, use can be made of a reference object that, for example, is formed by a constructional element, particularly a doorframe or door jamb at the location of the person 1. In particular it is considered that the person 1 from whom the photographs are taken, will stand in a doorway, so inside the doorframe (between the door jambs). Assuming the door jambs are extending in a right (vertical) way, the processing means can, on the basis of that information, correct possible (perspective) errors in the photos—in particular when the photos were taken relatively nearby, by which the exact person profiles of the person 1 can be determined with a greater accuracy from the photos.

The use of (for example) a doorframe provides an even more important advantage because the doorframe is ideally suited as a reference or measurement plane for the photo. The person, whose photo is taken, is instructed, both for making the picture "in face" as well as "in profile", to stand between the doorposts (door jambs). From experience with this instruction was observed that the person being photographed almost always neatly will stand with his/her shoulders between the door jambs for making the picture "in face", and with his/her nose to one of the door jambs for making the photo "in profile". Because the door jambs can be properly identified by the (picture) processing means, they can thus also determine with a good accuracy the reference or measurement plane where the person stands during taking the photos.

Figure 2:
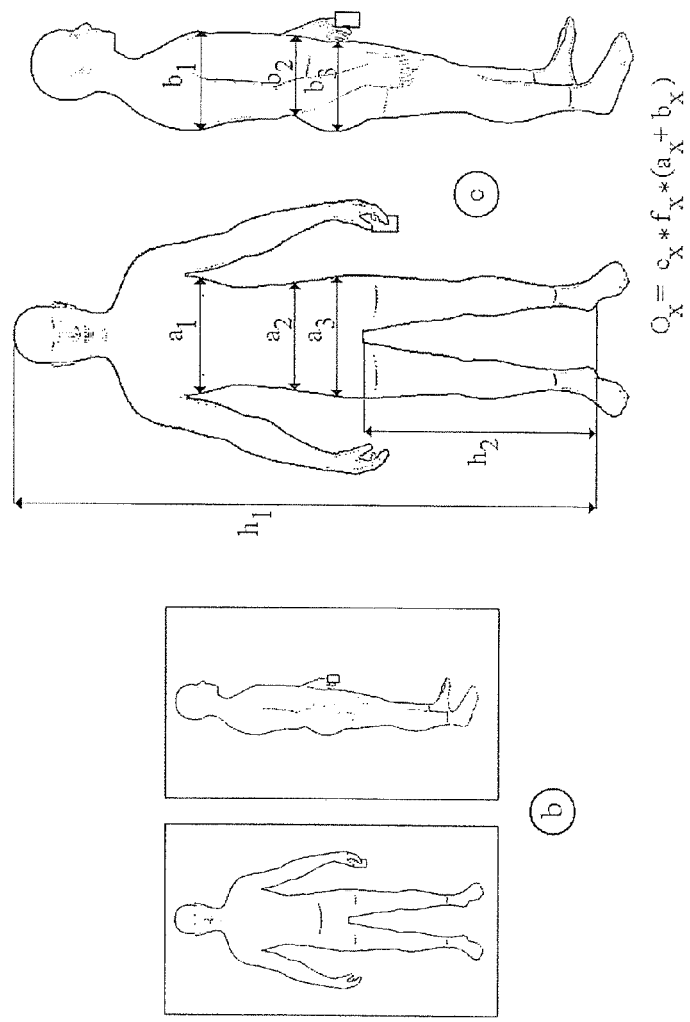
FIG. 2 shows an illustration of a first embodiment of the invention.
Figure 2:
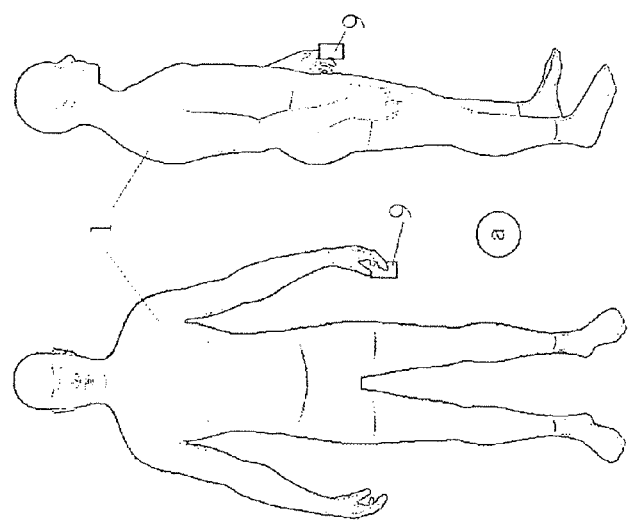

FIG. 2 illustrates that from the person 1 (FIG. 2a) two photographs are taken (FIG. 2b). Upon receipt, the processing means may firstly scale up the photos (as suggested in figure) to the actual (absolute) dimensions of the person 1. This scaling may optionally also be done in a later stage of the processing, always based upon the (scaling) relation (or calibration factor) between the absolute actual dimensions of the reference object known within the processing means (and for example included in the software), and the dimensions recorded by the camera (generally one dimension usually will suffice).

Next, the processing means derive from the images the exact person profiles and/or the appropriate height, width and depth dimensions. The measuring heights dimensions, shown in FIG. 2 with $h_1$ (total length) and $h_2$ (inside leg length)—are generally directly relevant for the length dimensions of the suit. The width and depth dimensions, shown in FIG. 2 with $a_1$, $a_2$ and $a_3$ respectively $b_1$, $b_2$ and $b_3$, are not directly relevant to the dimensions of a suit and therefore are converted by the processing means into (indeed relevant) girth dimensions $O_1$, $O_2$ and $O_3$ at different measuring height levels of the person, such as at the height of the chest, waist and hips. In practice (yet) others may be elected. For determining the width and depth dimensions of the body circumference use is made of the formula $O_x=f_x*(a_x+b_r)$, where x=1 (chest level), 2 (waist level) and 3 (hip level). The circumference factor $f_x$ may be different for different levels, but at these levels has values preferably between 1.56 and 1.72, preferably values between 1.62 and 1.66 and more preferably the value is substantially equal to 1.64.

If desired the measuring height levels, i.e. the heights of the breast, waist and hip level, are determined by the processing means on the basis of the received front or rear view and/or side view of the person and by using a generic data set with representations of virtual persons or clothes. In other words those levels can be derived from a generic data set with representations of virtual people, usually based on many observations, resulting in relevant (statistical) data. The measuring height levels can also be derived from the received photos of the person 1, for example by selecting for the waist level the smallest width of the person in front view, in the height region between 40 and 60% of the total height $h_1$.

To improve the result the value determined for the body circumference $O_x$ preferably is corrected by means of one or more correction factors $c_x$. For example, the person 1 can input additional information into the processing means, relating to his or her posture, particularly on the body circumferences (s) on the aforementioned measuring height levels, which additional information is converted by the processing means to one or more correction factors $c_x$. For example can be asked by the processing means during sending the photos via the display, whether the person wants to give some additional information about his/her posture: normal, short/thick, tall/lean, (too) heavy, (too) light, long or short arms, long or short legs, etc. On the basis thereof the processing means may subdivide the person into certain classes (classifying), which are linked by the processing means to certain values for the correction factors $c_1$, $c_2$, $c_3$.

Alternatively, for example on the basis of the received images (photos) of person 1, including the reference object 9, a seller or tailor may input additional (posture) information into the processing means related to the posture of the person, particularly on the body circumference in the said measuring height levels, the additional information is converted by the processing means into the correction factors $c_1$, $c_2$, $c_3$.

The correction factors c1, c2, c3 may also be determined by the processing means or be influenced by the processing means, namely by means of a generic data set with representations of virtual of persons. This option—illustrated in FIG. 3—uses "experiential knowledge" which in this case does not originate from the person 1 itself (based on some additional "classification questions") as indicated above, nor from a (expert) person like a seller or tailor, but from knowledge from experience contained in a generic data set with representations of virtual persons.

Figure 3:
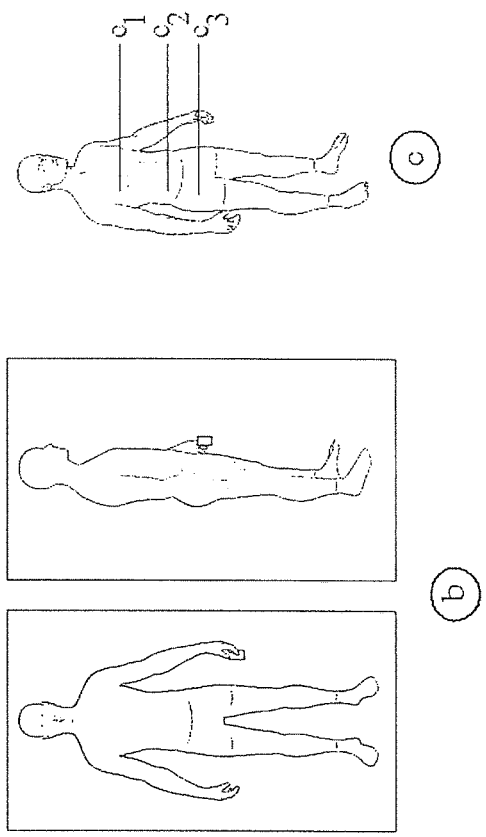
FIG. 3 shows an illustration of a second embodiment of the invention.
Figure 3:
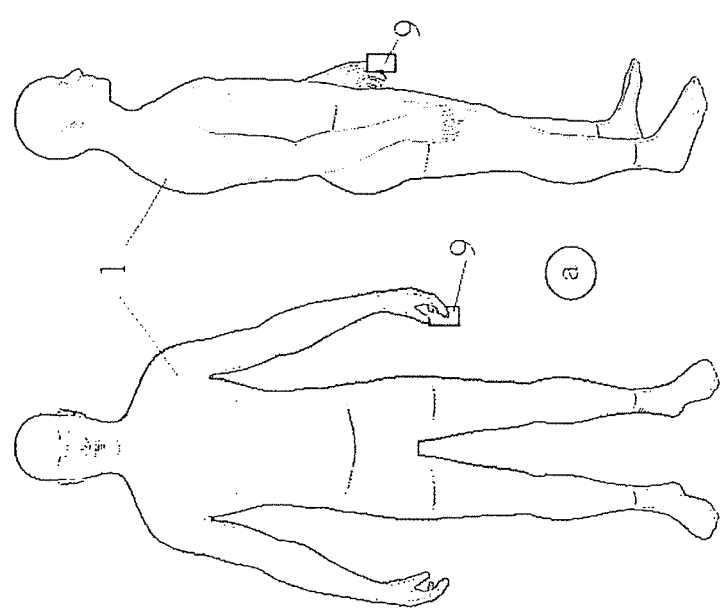

FIG. 3 shows that the person profiles (b) determined from the photos are compared with one (large) number (2D or 3D) of person models such as stored in the data set with representations of virtual persons. By using a "best match" algorithm the best matching representation or body model (FIG. 3c) is selected from the set of person profiles of the person and on the basis thereof the correction factors $c_1$, $c_2$, $c_3$ corresponding to the selected body model (FIG. 3c) are assigned to the person 1,—for example, by using a classification which beforehand is assigned to the stored representations— whereby the girth dimensions, calculated with the formula $O_x=f_x*(a_x+b_x)$ can be corrected for obtaining a better, more accurate result for $O_1$, $O_2$ and $O_3$. In this case the formula is therefore (for example) $O_x=c_x*f_x*(a_x+b_r)$.

Figure 4:
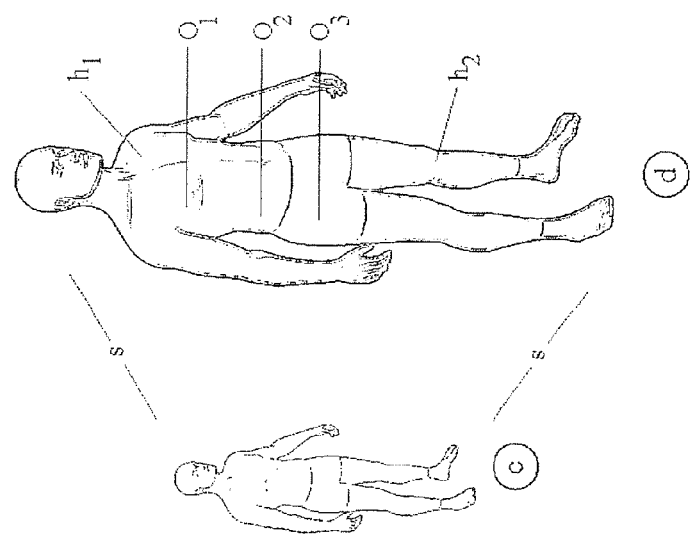
FIG. 4 shows an illustration of a third embodiment of the invention.
Figure 4:
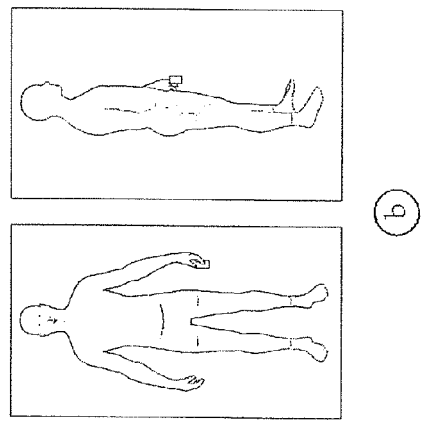
Figure 4:
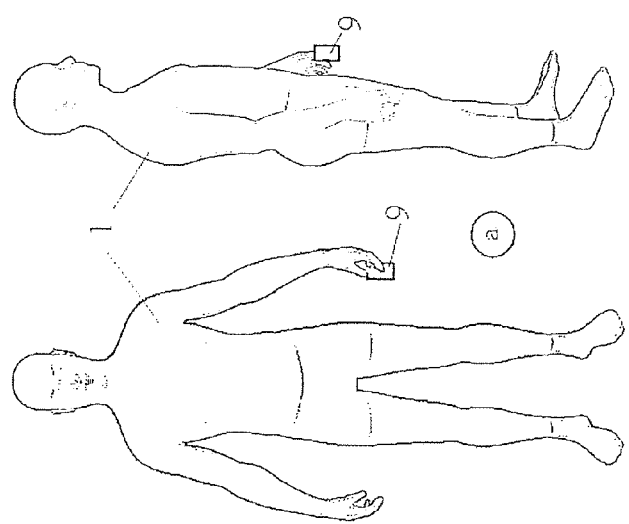

FIG. 4 shows an illustration of the above indicated solution route II, where the processing means on the basis of the received images of person 1 and the reference object 9 (FIG. 4a), classifies the person profiles (FIG. 4b) of the person 1, determined from the photos, into in one or more size or profile classes by using a generic data set with representations of virtual persons, for example using a suitable classification or matching algorithm. Subsequently the clothes dimensions, belonging to the classified size or profile classes, derived from the data set, are presented as required for the tailoring, which however were not immediately determinable from the received photos or person profiles clothes dimensions, in this example, the girth dimensions $O_1$, $O_2$ and $O_3$ at different levels (chest, waist, hips) of a person 1.

In this case, the generic data set with representations of virtual persons is not used, as was the case in the embodiment illustrated in FIG. 3, for determining the correction factors cx for the formula $O_x=c_x*f_x*(a_x+b_x)$, but for determining the circumference values Ox from the photos (in other words from the person profiles) and from the generic data set with representations of virtual persons. The person profiles derived from the photos are then compared to the generic data set with representations of virtual persons (for example comprising a large collection of virtual persons with a summary of their characteristics such as height, width, depth and volume dimensions or comprising a more as arithmetic model defined set of virtual persons with different characteristics). Assuming that within the generic data set with representations of virtual persons the values of $O_x$ are defined for different virtual people, it is possible that by means of a therefore suitable "best match" software a "best matching" virtual person can be found and can also the dimensions, not directly derivable from the person profiles determined from the photos, in particular the circumference dimensions, be derived from the "best matching" virtual persons. Moreover, it is not strictly necessary to derive the, indeed directly determinable, dimensions from the person profiles, like the length dimensions. As FIG. 4 illustrates it will suffice to select a virtual model (FIG. 4c) that "matches" best with the person profiles (FIG. 4b), then scale up (see "s")—using a calibration or scaling factor determined on the basis of the photo representation of the reference object 9 and the a priori known real dimensions thereof—, of the virtual person so that his/her size will 1:1 correspond with the actual dimensions of the (real) person 1, and then to derive all relevant dimensions both the length and girth dimensions from the virtual person.

Instead of "matching" can also be used (2D/3D) "fitting" or "rendering", for which in general different algorithms are known. In addition, the processing means may construct in an iterative process a (specific) virtual person based on the received images of the person and of a generic data set with representations of virtual persons, whereby, according to various criteria, the differences between the (3D) virtual person and the (2D) information to be extracted from pictures about the actual person, is iteratively minimized by that computer, so that the external features of that (specific) virtual person will optimally correspond with those of the actual person on the received images. Subsequently the clothes dimensions (such as volume dimensions, but if desired also length dimensions), belonging to the virtual person and derived from the data set, are presented as clothes dimensions of the real person, since after all that virtual person (selected by the computer by "matching"—see previous paragraph—or by "fitting/rendering" constructed/calculated) has a large, in other words maximum, external resemblance to an actual person 1.

As indicated above, instead of data that represent virtual persons, the data set may contain data that represent virtual garments, either a (limited) set of virtual ready-to-wear suits or either a (relatively large) set of virtual ready-to-wear suits. By using such data set with virtual clothes, the images (photos) received—converted to person profiles—are directly "matched" with these clothes data.

The data set may represent a collection of ready-to-wear garments offered by the supplier of these garments and from which the customer can make his/her choice. The data set comprises all relevant dimensions of those ready-to-wear clothes, which are necessary for "matching" or "fitting" with the (2D) person profiles that are derived from the photos received. The two methods that can be followed are either comparison (by means of "matching" or possibly "fitting" or "rendering") of the person profiles with 3D representations of various clothes in the data set, or either comparing the individual person profiles with a collection of virtual (2D) person profiles (for example derived from a collection of virtual 3D "tailor's dummies" or "mannequins") that correspond with all the clothes offered by the (online) supplier. In both cases, the "best match" 3D and/or 2D representation(s) belonging to the ready-to-wear clothes size is taken as the sought (ready-to-wear) clothes size or order size for the customer.

When data set represents a collection of tailored clothes, the same actions are performed: personal profiles of the customer are compared with all dimensions of the 3D or 2D representations of the (very large) collection of tailored suits and then the manufacturing or pattern dimensions (or measures) of (i.e. contained in) the most nearby garment representation is chosen for the actual manufacture of that piece of clothing.

The pattern dimensions—if they (all) are available in the data set—can be "read" from the data set and used for manufacturing the "matching" piece of clothing. But also the (virtual) tailor's dummy, corresponding with the "matching" piece of clothing, can be used to derive (missing) pattern or manufacture dimensions, by measuring, as it were, the (missing) dimensions of the "matching" tailor's dummy by means of (for example based on the application of "finite elements") software modules for measuring 2D or 3D models (in this case the "matching" virtual tailor's dummy).

Figure 5:
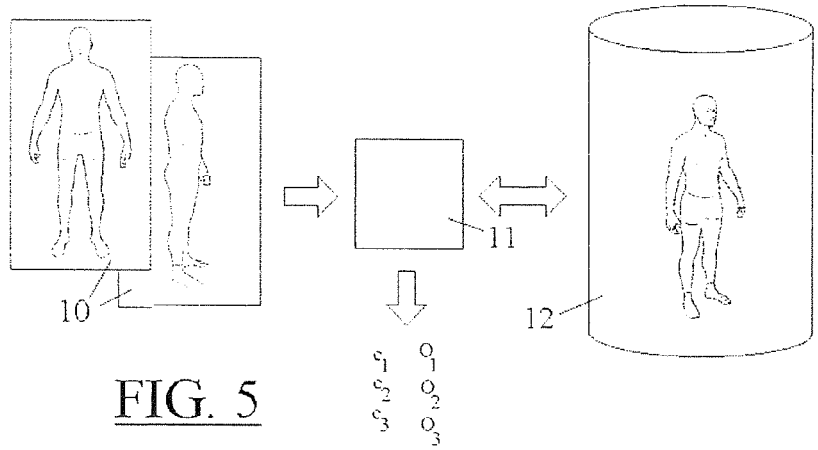
FIG. 5-7 show very schematically the operation of three different alternative systems.
Figure 6:
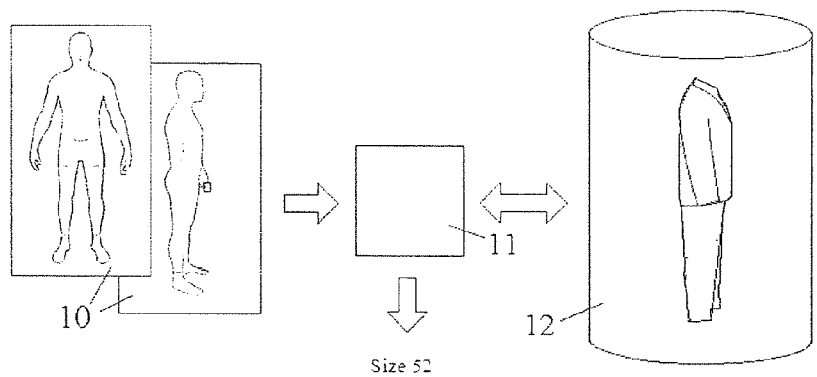
Figure 7:
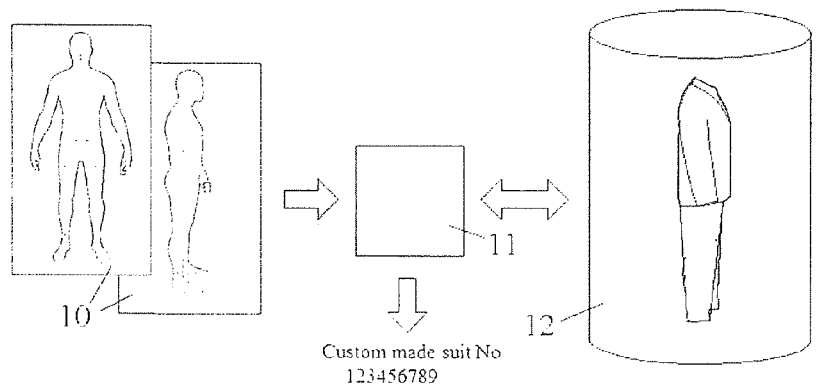

Finally, the FIGS. 5-7 show a very schematic overview of the operation of three different embodiments of the invention as discussed above.

FIG. 5 shows schematically the two profile images 10, which are supplied by the person 1 (in previous figures) to the processing means 11 and are there converted into two person profiles (one from the side and one from front/rear). The person profiles derived from the images 10 are compared with a data set 12 (in a database) by the processing means 11 to representations of virtual persons. Through matching, fitting or rendering software that representation is selected on which the two person profiles of person 1 (the customer) fit best and the corresponding parameters $c_1, c_2, c_3, O_1, O_2, O_3$,—which either in advance can be calculated for any representation and stored or either until after selection of the selected representation is calculated—as the sought correction factor ($c_1, c_2, c_3$) for the formula $O_x=c_x*f_x*(a_x+b_x)$—see the discussion of FIG. 3—or circumference dimension ($O_1, O_2, O_3$)—see the discussion of FIG. 3—used for further processing.

FIG. 6 shows again the two profile images 10, which are converted in the processing means 11 into two person profiles and are compared by the processing means 11 to a data set 12, here however filled with representations of virtual ready-to-wear clothes (or virtual "tailor's dummies", each with a clothes size corresponding to one piece of ready-to-wear clothing). The representations can be either in the form of 3D representations or either in the form of pairs (couples) of 2D representations, in other words 2D profiles (one side profile and one front or rear profile) of the virtual clothes or virtual tailor's dummies corresponding therewith. By means of matching, fitting or rendering software that (virtual) representation is selected in which the pair of (real) person profiles of person 1 (the customer) fits best and is the corresponding ready-to-wear clothes size (e.g. size 52) of the selected ("best matching) ready-to-wear piece of clothing used as order size for the customer.

FIG. 7 shows again the two profile images 10, which are converted in the processing means 11 into two person profiles and are compared by the processing means 11 to a data set 12, but here to a large collection of representations (with mutually very minor differences, in other words a representation series with a high resolution) of virtual "tailored" clothes (or virtual "tailor's dummies" each corresponding to the clothes size of one piece of tailored clothing). Again, the representations may have the form of 3D representations of pairs of 2D profiles. By means of matching, fitting or rendering software that representation is selected in which the pair of person profiles of person 1 (the customer) fits best and are the associated manufacturing or pattern measures of the selected ("best matching") tailored piece of clothing used as the basis for the manufacture of the tailored suit ordered by the customer.

In the foregoing, various aspects of the invention are explained which allows the public, according to the invention, to buy "online" clothes like suits etc., wherein a simple camera can be used for determining the clothes size. By using firstly 2D images provided by the camera and secondly generic information on the shape of the human body and/or the body lining (such as ready-to-wear, custom tailored or tailored suits), the photos taken in the (non-professional) home location can be used for determining the ready-to-wear clothes size with sufficient precision and/or all relevant dimensions for selecting and/or manufacturing or adopting the clothes ordered.

The invention claimed is:

1. A method for determining one or more clothes dimensions of a person, which method comprises the steps:
   the person provides at least one, profile image of himself/herself;
   the person sends the at least one profile image to processing means;
   the person supplies calibration data including alphanumeric data, being the length of the person, to the processing means;
   the processing means scale the at least one profile image using said length to produce a scaled profile image;
   the processing means determine person profiles of the person from the at least one scaled profile image; and
   the processing means determine using said person profiles, and at least partially using a data set with representations of virtual persons or clothes, one or more clothes dimensions of the person.

2. The method according to claim 1, wherein the person provides at least one image of himself/herself in predominantly front or rear view and at least one image of himself/herself in predominantly side view and sends them to the processing means.

3. The method according to claim 2, wherein the processing means determine a width $a_x$ from the at least one image in predominantly front or rear view of the person on one or more measurement height levels x=1 ... n, and a depth $b_x$ from the at least one image in predominantly side view, and determine, by using the formula $O_x=f_x*(a_x+b_x)$, the body circumference $O_x$ on one or more measurement height levels x, where for each of the measuring height levels $f_x$ is a corresponding circumference factor derived from a generic data set with representations of virtual persons or clothes.

4. The method according to claim 3, wherein the circumference factor fx for each measuring height, is between 1.56 and 1.72.

5. The method according to claim 4, wherein said measuring height levels are determined by the processing means based on the at least one image in predominantly front or rear view, the at least one image in predominantly side view or both and by using a generic data set with representations of virtual persons or clothes.

6. The method according to claim 3, wherein the determined value for the body circumference $O_x$ is corrected by using one or more correction factors $c_x$.

7. The method according to claim 6, wherein the person supplies additional information to the processing means, and the additional information is converted by the processing means into one or more correction factors $c_x$.

8. A method for determining one or more clothes dimensions of a person, which method comprises the steps:
   the person provides at least one, profile image of himself/herself;
   the person sends the at least one profile image to processing means;
   the person supplies calibration data including alphanumeric data, being the length of the person, to the processing means;
   the processing means determine person profiles of the person from the at least one profile image and the calibration data; and
   the processing means determine, at least partially using a data set with representations of virtual persons or clothes, one or more clothes dimensions of the person;
   wherein the person provides at least one image of himself/herself in predominantly front or rear view and at least one image of himself/herself in predominantly side view and sends them to the processing means;
   wherein the processing means determine a width $a_x$ from the at least one image in predominantly front or rear view of the person on one or more measurement height levels x=1 ... n, and a depth $b_x$ from the at least one image in predominantly side view, and determine, by using the formula $O_x=f_x*(a_x+b_x)$, the body circumference $O_x$ on one or more measurement height levels x, where for each of the measuring height levels $f_x$ is a corresponding circumference factor derived from a generic data set with representations of virtual persons or clothes;
   wherein the determined value for the body circumference $O_x$ is corrected by using one or more correction factors $c_x$;
   wherein an operator supplies, based on the images, directly determinable first clothes dimensions of the person or both, additional information to the processing means and the additional information is converted by the processing means into one or more correction factors $c_x$.

9. The method according to claim 6, wherein the one or more correction factors $c_x$ are determined by the processing means based on the images directly determinable first clothes dimensions of the person or both, using a generic data set with representations of virtual persons or clothes.

10. A method for determining one or more clothes dimensions of a person, which method comprises the steps:
    the person provides at least one profile image of himself/herself;
    the person sends the at least one profile image to processing means;
    the person supplies calibration data including alphanumeric data, being the length of the person, to the processing means;
    the processing means scale the at least one profile image using said length to produce a scaled profile image;
    the processing means determine person profiles of the person from the at least one scaled profile image; and
    the processing means determine using said person profiles, and at least partially using a data set with representations of virtual persons or clothes, one or more clothes dimensions of the person; and wherein:
    the processing means apply a matching, fitting or rendering algorithm for determining the largest or optimal match between the person profiles and the data set.

11. A method for determining one or more clothes dimensions of a person, which method comprises the steps:
the person provides at least one profile image of himself/herself;
the person sends the at least one profile image to processing means;
the person supplies calibration data including alphanumeric data, being the length of the person, to the processing means;
the processing means scale the at least one profile image using said length to produce a scaled profile image;
the processing means determine person profiles of the person from the at least one scaled profile image; and
the processing means determine using said person profiles, and at least partially using a data set with representations of virtual persons or clothes, one or more clothes dimensions of the person; and wherein:
the data set comprises a virtual representation of each of multiple ready-to-wear pieces of clothing, and
the processing means:
compare the person profiles with the virtual representations and
select therefrom a most appropriate virtual representation and
determine a ready-to-wear clothes size, type or both of the most appropriate virtual representation as a most appropriate ready-to-wear clothes size, type or both for the person.

12. A method for determining one or more clothes dimensions of a person, which method comprises the steps:
the person provides at least one profile image of himself/herself;
the person sends the at least one profile image to processing means;
the person supplies calibration data including alphanumeric data, being the length of the person, to the processing means;
the processing means scale the at least one profile image using said length to produce a scaled profile image;
the processing means determine person profiles of the person from the at least one scaled profile image; and
the processing means determine using said person profiles, and at least partially using a data set with representations of virtual persons or clothes, one or more clothes dimensions of the person; and wherein:
the data set contains a large number of virtual representations of various clothes having mutually very minor differences, including all relevant manufacturing or pattern measures, and the processing means compare the person profiles to all those virtual representations and subsequently select a most appropriate representation and determine manufacturing or pattern measures of the most appropriate representation as the manufacturing or pattern measures for manufacturing a tailored piece of clothing for the person.

13. A method for determining one or more clothes dimensions of a person, which method comprises the steps:
the person provides at least one profile image of himself/herself;
the person sends the at least one profile image to processing (11)means;
the person supplies calibration data including alphanumeric data, being the length of the person, to the processing means;
the processing means scale the at least one profile image using said length to produce a scaled profile image;
the processing means determine person profiles of the person from the at least one scaled profile image; and
the processing means determine using said person profiles, and at least partially using a data set with representations of virtual persons or clothes, one or more clothes dimensions of the person; and wherein:
the person profiles are 2D profiles and said data set comprises a collection of 3D representations to which the 2D profiles are compared.

14. A method for determining one or more clothes dimensions of a person, which method comprises the steps:
the person provides at least one profile image of himself/herself;
the person sends the at least one profile image to processing means;
the person supplies calibration data including alphanumeric data, being the length of the person, to the processing means;
the processing means scale the at least one profile image using said length to produce a scaled profile image;
the processing means determine person profiles of the person from the at least one scaled profile image; and
the processing means determine using said person profiles, and at least partially using a data set with representations of virtual persons or clothes, one or more clothes dimensions of the person; and wherein:
the person profiles are 2D profiles and said data set comprises a collection of 2D representations to which the 2D profiles are compared.

15. The method according to claim 1, wherein the person sends the at least one profile image into the processing means via a local or PC.

16. The method of claim 15, wherein at least a portion of the processing means is installed locally.

17. The method according to claim 15, wherein at least a portion of the processing means centrally installed and communication between the local terminal or PC and the centrally installed portion of the processing means is executed via a data network.

18. The method according to claim 15, wherein at least a portion of the processing means is installed in a distributed way.

19. A system comprising processing means, suitable for carrying out a method for determining one or more clothes dimensions of a person, which method comprises the steps:
the person provides at least one profile image of himself/herself;
the person sends the at least one profile image to the processing means;
the person supplies calibration data including alphanumeric data, being the length of the person, to the processing means;
the processing means scale the at least one profile image using said length to produce a scaled profile image;
the processing means determine person profiles of the person from the at least one scaled profile image; and
the processing means determine using said person profiles, and at least partially using a data set with representations of virtual persons or clothes, one or more clothes dimensions of the person.

* * * * *